United States Patent [19]

Williamson

[11] Patent Number: 5,126,059
[45] Date of Patent: Jun. 30, 1992

[54] PRECIPITATION CONTROL

[75] Inventor: C. Darwin Williamson, Sugar Land, Tex.

[73] Assignee: Nalco Chemical Company

[21] Appl. No.: 706,463

[22] Filed: May 28, 1994

[51] Int. Cl.$^5$ .................. C23F 11/04; E21B 43/27
[52] U.S. Cl. .................. 252/8.552; 252/8.553; 252/8.555; 252/146; 166/311; 166/312
[58] Field of Search .................. 166/311, 312, 902; 252/8.552, 8.553, 8.555, 142, 146; 134/3

[56] References Cited

U.S. PATENT DOCUMENTS

| | | | |
|---|---|---|---|
| 2,706,714 | 4/1955 | Hughes et al. | 252/8.555 |
| 2,836,558 | 5/1958 | Hughes | 252/8.555 |
| 2,877,848 | 3/1959 | Case | 166/312 |
| 4,003,856 | 1/1977 | Sharp | 252/8.552 X |
| 4,317,735 | 3/1982 | Crowe et al. | 252/8.553 |
| 4,381,950 | 5/1983 | Lawson | 134/41 |
| 4,622,212 | 11/1986 | McManus et al. | 423/226 |
| 4,679,631 | 7/1987 | Dill et al. | 166/307 |
| 4,683,954 | 8/1987 | Walker et al. | 166/308 |
| 4,938,925 | 7/1990 | Peterson et al. | 422/12 |
| 5,013,483 | 5/1991 | Frenier et al. | 252/396 |

Primary Examiner—John S. Maples
Assistant Examiner—C. Sayala
Attorney, Agent, or Firm—Dodge, Bush, Moseley & Riddle

[57] ABSTRACT

A precipitation control composition comprises an iron sequestering agent and a ketone-type compound as sulfide modifier. The precipitation control composition is useful to retard undesirable precipitation of iron and sulfur species from an acid solution of increasing pH. In combination with an acid solution, the precipitate control composition comprises an acidizing composition which is particularly useful in the acidizing of sour hydrocarbon wells. Also disclosed is the method of retarding undesirable precipitation of iron and sulfur species from an acid solution of increasing pH.

22 Claims, No Drawings

PRECIPITATION CONTROL

FIELD OF THE INVENTION

This invention relates to control of undesirable precipitation of iron and sulfur species. In a particular aspect, the invention relates to the control of undesirable precipitation of iron hydroxides and sulfides and elemental sulfur during the treatment of sour hydrocarbon wells with acid solution. In addition, the invention relates to compositions employed to retard such undesirable precipitation.

BACKGROUND OF THE INVENTION

It is well known in the art to treat hydrocarbon wells, i.e., oil wells and/or natural gas wells, with acid solution. The acid so provided reacts with basic components, for example, magnesium and calcium carbonates, of the formation through which the well is being or has been drilled. Such reaction serves to enlarge the openings and channels through which the hydrocarbon passes during recovery and production of the hydrocarbon. As the provided acid reacts with the basic components of the formation and the pH increases, i.e., the acid "spends", various precipitates tend for form which lead to undesirable plugging of the formation.

In many cases the acid solution, after partial reaction, will contain ferrous and ferric ions and at a sufficiently high pH one or more iron hydroxides will begin to precipitate. This undesirable precipitation leads to formation plugging and has other detrimental effects, particularly when the iron hydroxide is ferric hydroxide. To control this ferric hydroxide precipitation it is known to employ an iron sequestering agent and/or an iron reducing agent to maintain the iron ions in solution and/or reduce the ferric ions to ferrous ions. Typical iron sequestering agents include citric acid and ethylenediaminetetraacetic acid.

When the hydrocarbon well undergoing acid treatment is "sour", i.e. the well product contains hydrogen sulfide or other sulfur-containing compounds, additional problems result. The presence of sulfide ions tends to reduce ferric ions to ferrous ions, a somewhat desirable result. The ferrous sulfide tends to stay in solution if the pH is sufficiently low, e.g., the solution pH is below about 1.9, but as the acid spends the pH will rise and ferrous sulfide as well as ferric hydroxide precipitates. Moveover, elemental sulfur is also formed by the ferric ion reduction and will also precipitate. The combined precipitate tends to plug the formation. As a consequence, the acidization of sour hydrocarbon wells is particularly complex. While various proposals have been made to control the undesirable precipitation which takes place during sour well acidization, the proposals have not produced entirely satisfactory results.

One such proposal designed to prevent the undue precipitation of ferric hydroxide and ferrous sulfide was to maintain the pH of the acidizing solution below 1.9 at all times. However, in most acid treatments this pH control is not easily achieved. A method and a composition for precipitate control during sour gas acidization is disclosed by U.S. Pat. No. 4,633,949. This proposal included the use of an iron sequestering agent such as ethylenediaminetetraacetic acid in combination with an iron reducing agent such as erythorbic acid as a composition to be added to the acidizing solution. The combination did not, however, prevent the formation of precipitates containing sulfur species such as elemental sulfur.

Somewhat better results are disclosed by Dill et al in U.S. Pat. No. 4,888,121 and the related U.S. Pat. No. 4,949,790. These patents, based on the same disclosures, use an iron sequestering agent and a sulfide modifier to be used in conjunction with the acidizing solution. The iron sequestering agent was a conventional agent such as ethylenediaminetetraacetic acid and the sulfide modifier is an aldehyde or related materials such as acetals, hemiacetals or other materials likely to generate aldehyde under the acid conditions used in the well treatment process. Certain of the combinations disclosed by Dill et al are comparatively effective in preventing the undesirable precipitation which normally accompanies sour well acidization. However, it would be of advantage to provide an alternate method for control of precipitation of iron and sulfur species as well as the compositions employed in that method.

SUMMARY OF THE INVENTION

The present invention provides an improved method for the control of undersirable precipitation of iron and sulfur species during acid treatments. The invention provides a composition useful in the control of iron and sulfur species from an acid solution of increasing pH. In particular, the invention provides compositions to be used in the acid treatment of sour hydrocarbon wells and the method for the acidization of sour hydrocarbon wells which employs those compositions.

The invention relates to an improved precipitation control composition comprising an iron sequestering agent and a sulfide modifier as well as an acidizing composition used in acidizing sour hydrocarbon wells which comprises that precipitation control composition and at least one strong acid. The invention also relates to a method of acidizing sour hydrocarbon wells which utilizes those compositions.

DESCRIPTION OF THE INVENTION

The precipitation control composition comprises an iron sequestering agent and an improved sulfide modifier and is used to retard the undesirable precipitation of iron and sulfur species from acid solutions of increasing pH including but not limited to the retardation of the iron hydroxide and sulfide and elemental sulfur precipitation which typically takes place during the acidization of sour hydrocarbon wells.

In the precipitation control composition of the invention, the iron sequestering agent comprises at least one of the polyfunctional organic compounds having a component moiety of hydroxy and/or amino in addition to carboxyl groups. Such materials are recognized in the art as having the ability to sequester or maintain in aqueous solution a number of multi-valent metal ions including ferrous ion and ferric ion. Illustrative of such iron sequestering agents are amino-containing agents such as ethylenediaminetetraacetic acid and nitrilotriacetic acid, hydroxy-containing carboxylic acids such as citric acid and hydroxyacetic acid, and polycarboxylic acids containing both amino and hydroxy functionality such as hydroxyethylethylenediaminetriacetic acid. Mixtures of two or more iron sequestering agents are also satisfactory. The sequestering agents nitrilotriacetic acid and ethylenediaminetetraacetic acid are preferred although in the precipitation control agents of the invention citric acid optionally mixed with hydroxyacetic acid, is particularly preferred as the iron sequestering agent.

The improved sulfide modifier of the precipitation control compositions of the invention comprises a ketone-type compound. By "ketone-type compound" is meant at least one of the class of compounds conventionally known as ketones including diketones but also including the polyfunctional ketone derivatives which convert to ketones under the acid conditions in which the precipitation control compositions are used. Illustrative of such derivatives are the ketals, hemi-ketals and the hydroxy-keto condensation products such as diacetone alcohol. In terms of the ketones, the improved sulfide modifier is an aliphatic ketone, an aromatic ketone or a mixed aliphatic-aromatic ketone of up to 15 carbon atoms inclusive. Aromatic ketones such as diphenyl ketone and phenyl tolyl ketone are satisfactorily utilized in the precipitation control compositions of the invention as are mixed aliphatic-aromatic ketones such as acetophenone and ethyl phenyl ketone. Preferred, however, are aliphatic ketones of up to 8 carbon atoms inclusive and from 1 to 2 keto moieties. Illustrative of such ketones are acetone, methyl ethyl ketone, diethyl ketone, ethyl n-propyl ketone, methyl t-butyl ketone, cyclohexanone, dimethylcyclohexanone, 2,4-pentanedione and 2,7-octanedione. Particularly preferred are the straight-chain monoketones of up to 5 carbon atoms inclusive and especially preferred is acetone.

The precise molar ratio of iron sequestering agent to sulfide modifier in the improved precipitation control composition of the invention is not critical and molar ratios of the iron sequestering agent to the sulfide modifier from about 4:1 to about 1:4 are suitable. Preferred precipitation control agents incorporate molar ratios of iron sequestering agent to sulfide modifier from about 1.2:1 to about 1:1.2.

In some modifications the iron sequestering agent and the sulfide modifier form a solution on mixing the two components. In other instances it is useful to employ a mutual solvent with the components. Suitable solvents are inert, polar organic solvents including the ethers such as acyclic ethers, e.g., diethyl ether, di-i-butyl ether and methyl 2-ethylhexyl ether, cyclic ethers, e.g., dioxane and tetrahydrofuran, and hydroxy ethers such as ethylene glycol monomethyl ether, ethylene glycol monobutyl ether and diethylene glycol monoethyl ether. The amount of solvent to be used, if solvent is used, is the amount required to render a mixture of the iron sequestering agent and the sulfide modifier mutually miscible, although larger amounts may be used.

The precipitation control composition suitably but optionally may contain a variety of other materials which do not interfere with the function of the composition including surface active materials such ethoxylated alkylphenols and fatty acid amides, corrosion inhibitors, pH control additives, reducing agents and oxygen scavengers such as erythorbic acid and hydroxylamine. The presence of such additives is optional but, if present, quantities of the additives should be such that will not interfere with the intended function of the precipitation control composition.

Although the preferred embodiment in which the precipitation control compositions are used is in the acidization of sour hydrocarbon wells, the compositions are suitably employed whenever there is a likelihood of the undesired precipitation of iron and sulfur species from acid solutions of increasing pH. For example, the precipitation control compositions are used to retard precipitation during operations which remove certain types of scale from the internal surfaces of industrial equipment such as water heaters and steam boilers. Whenever a sulfide scale is removed from a surface comprising iron or an alloy of iron by acid treatments, the possibility of generating sulfide and iron ions exists and such generation may result in a variety of precipitates being formed as the pH of the cleaning solution increases. Such precipitation would unduly interfere with the cleaning operation but is retarded by the addition of the precipitation control composition of the invention to the cleaning solution.

As stated, however, the preferred utilization of the precipitation control compositions of the invention is in the use of the composition to retard undesirable precipitation of iron and sulfur species during acidization of sour hydrocarbon wells. In the acidization of such sour hydrocarbon wells, acid is injected into the well bore to enlarge the openings or channels through which hydrocarbon passes during the course of hydrocarbon production or through which other materials are provided to encourage hydrocarbon flow into other wells. Thus, the acidization treatment is applied to injection wells in addition to production wells. The acid is usefully provided into the space between the wall of the formation and the internal pipe string of a well or alternatively is passed down such pipe to contact the formation during upwardly passage. In any event, the acidizing solution typically comprises an aqueous solution of hydrochloric acid or hydrofluoric acid or mixtures thereof having an initial pH below 1. It is generally preferred that the acidizing solution comprise hydrochloric acid optionally employed with an organic acid such as acetic acid or formic acid. The use and composition of such acidizing solutions are well known and conventional. In the conduct of the present invention an acidizing composition is formed from the acidizing solution, and the precipitation control composition, i.e., the iron sequestering agent and the sulfide modifier. The provision of the iron sequestering agent and the sulfide modifier to the acidizing solution is made separately or together and the mixing with the acidizing solution takes place before or subsequent to the introduction of the acidizing solution to the well. In one embodiment the components of the precipitation control composition are separately mixed and the acidizing composition is formed by adding the resulting mixture to the acidizing solution prior to entry into the well. In an alternate embodiment, the components of the acidizing composition are provided separately and the composition is formed by the mixing of the components in the openings or channels of the formation whose enlargement is desired. It is preferred, however, that in any embodiment the formation of the acidizing composition by the mixture of the precipitation control composition and the acidizing solution be achieved before the acid has reacted with the formation to a significant extent e.g., while the pH of the acidizing solution remains less than about 1.9, preferably less than 1.

The proportions of acidizing solution, iron sequestering agent and sulfide modifier to be used in the acidizing composition will vary somewhat with the nature of the environment in which the composition is used, e.g., the chemical nature of a well bore formation acidized with acidizing composition. In general, the proportion of iron sequestering agent should be from about 0.25% by weight to about 10% by weight based on the total acidizing composition. Preferably the proportion of the iron sequestering agent should be from about 2% by weight to about 8% by weight on the same basis. The amount of sulfide modifier to be employed is suitably from about 0.25% by weight to about 5% by weight based on total acidizing composition with amounts from about 1% by weight to about 4% by weight being preferred. Sufficient precipitation control composition should be provided to retard whatever undesirable precipitation of iron and sulfur species is likely to be encountered as the acid of the acidizing solution spends and the pH of the solution rises.

The acidizing compositions are useful in a variety of other applications where it is desired to retard undesired precipitation of iron and sulfur species such as clean-up operations of iron-containing scale at a variety of locations where sulfide-containing compounds are likely to also be present. Such applications include the cleaning of injection and disposal wells and the cleaning of the surfaces of tubing and casing and the internal surfaces of industrial equipment.

The invention is further illustrated by the following Comparative Examples (not of the invention) and the illustrative Embodiments which should not be regarded as limiting.

COMPARATIVE EXAMPLE I

To determine the effect of an increase in pH of an acidic solution containing ferric ions and sulfide ions, 200 ml of a 15% by weight aqueous solution of hydrochloric acid was mixed with sufficient ferric chloride solution to give a concentration of ferric ions of 5000 mg/l. The resulting solution was placed in a flask with 150 g of white marble chips and hydrogen sulfide was introduced into the solution through an aeration tube. The solution was maintained at 75° C. and atmospheric pressure and sufficient hydrogen sulfide was added to maintain saturation of the solution. When the acid was spent the solids present in the flask were recovered by filtration and analyzed by standard techniques including X-ray diffraction to determine the percentage by weight of iron (as ferric acid) and sulfur (as sulfate) in the precipitate which had been formed as the acid became spent. The precipitate contained 57% by weight sulfur (as sulfate) and 15% by weight iron (as ferric oxide).

COMPARTIVE EXAMPLE II

The procedure of Comparative Example I was repeated with the additional presence of mixture of citric acid and hydroxyacetic acid as an iron sequestering agent present in a concentration of 5% by weight. The analysis of the precipitate formed as the acid became spent indicated 51% by weight sulfur (as sulfate) and 2% iron (as ferric oxide).

COMPARATIVE EXAMPLE III

To determine the effect of an increase in pH of an acidic solution containing ferric ions and sulfide ions in the presence of a precipitation control additive composition disclosed and evaluated in U.S. 4,888,121, a solution was prepared which contained 5% by weight of an aqueous mixture of 18.2% hydroxyacetic acid and 22.9% citric acid and 3.5% by weight of propionaldehyde. The propionaldhyde had been blended with butyl cellosolve. To the resulting combination was added 300 ml of an aqueous solution containing 15% by weight of hydrochloric acid. The solution was mixed with ferric chloride to give a ferric concentration of 5000 mg/l. Hydrogen sulfide as a source of sulfide ions was added through an areation tube and the solution was placed in a flask containing a stoichiometric excess of white marble chips. The solution was maintained at room temperature and atmospheric pressure for 24 hours. The precipitate formed was analyzed by standard techniques and found to contain 32% by weight sulfur (as sulfate) and 2% by weight iron (as ferric oxide).

ILLUSTRATIVE EMBODIMENT I

The procedure of Comparative Example III was repeated except that, instead of the propionaldehyde, 3.5% by weight of acetone was provided. Analysis of the precipitate indicated 6% by weight of sulfur (as sulfate). No iron was detected in the precipitate.

ILLUSTRATIVE EMBODIMENT II

The procedure of illustrative Embodiment I was repeated except that equivalent amount of several other ketones were provided in place of the acetone of illustrative Embodiment I. In each case, the precipitate was analyzed for the presence of sulfur (as the sulfate) and iron (as ferric oxide). The results are shown in the following table.

TABLE

| Ketone | % wt S | % wt Fe |
|---|---|---|
| Methyl Ethyl Ketone | 29 | 3.8 |
| 2,4-Pentanedione | 37 | 9 |
| 3-Pentanone | 27 | Not Detected |
| Diacetone Alcohol | 18 | 2 |

What is claimed is:

1. A precipitate control composition consisting essentially of an iron sequestering agent having carboxyl groups and moiety selected from hydroxy, amino or hydroxy and amino and a sulfide modifier selected from ketones of up to 15 carbon atoms inclusive and from 1 to 2 keto groups or compounds selected from ketals, hemiketals or ketone condensation products containing hydroxy and keto groups, which compounds generate such ketone under acid conditions.

2. The composition of claim 1 wherein the iron sequestering agent is at least one polyfunctional organic compound selected from aminocarboxylic acid, hydroxycarboxylic acid or polycarboxylic acid having both amino and hydroxyl group.

3. The composition of claim 2 wherein the sulfide modifier is aliphatic monoketone of up to 5 carbon atoms inclusive.

4. The composition of claim 1 wherein the iron sequestering agent is selected from nitriloacetic acid, ethylenediaminetetraacetic acid or citric acid optionally mixed with hydroxyacetic acid.

5. The composition of claim 4 wherein the ketone is acetone.

6. The composition of claim 5 wherein the iron sequestering agent is a mixture of citric acid and hydroxyacetic acid.

7. An acidizing composition comprising (1) an acidizing solution having a pH below 1 selected from aqueous hydrochloric acid, aqueous hydrofluoric acid and mixtures thereof and (2) the precipitate control composition of claim 1.

8. The acidizing composition of claim 7 wherein the iron sequestering agent of the precipitation control composition is at least one polyfunctional organic compound selected from aminocarboxylic acid, hydroxycarboxylic acid or polycarboxylic acid having both amino and hydroxyl group.

9. The acidizing composition of claim 8 wherein the sulfide modifier of the precipitate control composition is aliphatic monoketone of up to 5 carbon atoms inclusive.

10. The acidizing composition of claim 9 wherein the iron sequestering agent is selected from nitriloacetic acid, ethylenediaminetetraacetic acid or citric acid optionally mixed with hydroxyacetic acid.

11. The acidizing composition of claim 10 wherein the acid is hydrochloric acid.

12. The acidizing composition of claim 11 wherein the ketone is acetone.

13. The acidizing composition of claim 12 wherein the iron sequestering agent is a mixture of citric acid and hydroxyacetic acid.

14. A method of retarding the precipitation of undesirable iron and sulfur species from an acid solution of increasing pH containing iron ions and sulfide ions by adding to the acid solution the precipitation control composition of claim 1.

15. The method of claim 14 wherein the acid solution is an aqueous solution of hydrochloric acid or hydrofluoric acid or mixtures thereof having an initial pH below about 1.

16. The method of claim 15 wherein the iron sequestering agent is a mixture of citric acid and hydroxyacetic acid.

17. The method of claim 16 wherein the sulfide modifier is an aliphatic monoketone of up to 5 carbon atoms inclusive.

18. The method of claim 17 wherein the ketone is acetone.

19. In the acid treatment of a sour hydrocarbon well penetrating a subterranean formation by introducing into such formation a composition comprising aqueous acid solution, an iron sequestering agent and a sulfide modifier while retarding the precipitation of iron and sulfur species as the pH of the acid solution increases, the improvement of using as the sulfide modifier a compound selected from ketones of up to 15 carbon atoms and from 1 to 2 keto groups or compounds selected from ketals, hemi-ketals or ketone condensation products containing hydroxy and keto groups.

20. The treatment of claim 19 wherein the ketone-type compound is aliphatic monoketone of up to 5 carbon atoms inclusive.

21. The treatment of claim 20 wherein the ketone is acetone.

22. The treatment of claim 20 wherein the ketone is 3-pentanone.

* * * * *

UNITED STATES PATENT AND TRADEMARK OFFICE
CERTIFICATE OF CORRECTION

PATENT NO.  : 5,126,059
DATED       : JUNE 30, 1992
INVENTOR(S) : C. DARWIN WILLIAMSON

It is certified that error appears in the above-identified patent and that said Letters Patent is hereby corrected as shown below:

On the title page, Item [22]:
  Filed: May 28, 1994

LETTERS PATENT SHOULD READ AS:

Filed: May 28, 1991

Signed and Sealed this

Seventh Day of December, 1993

Attest:

BRUCE LEHMAN

Attesting Officer

Commissioner of Patents and Trademarks